Sept. 8, 1959 H. R. BRUET 2,903,232
FEELER MECHANISM FOR HYDRAULICALLY
OPERATED COPYING MACHINES
Filed March 1, 1955 4 Sheets-Sheet 3
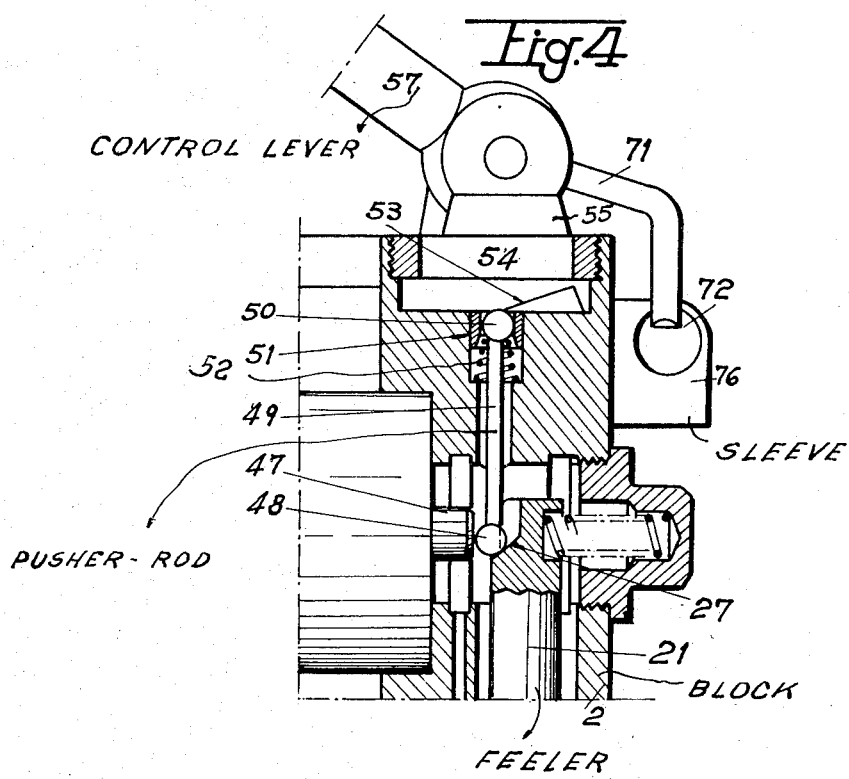
INVENTOR
HENRI RENÉ BRUET,
ATTORNEYS

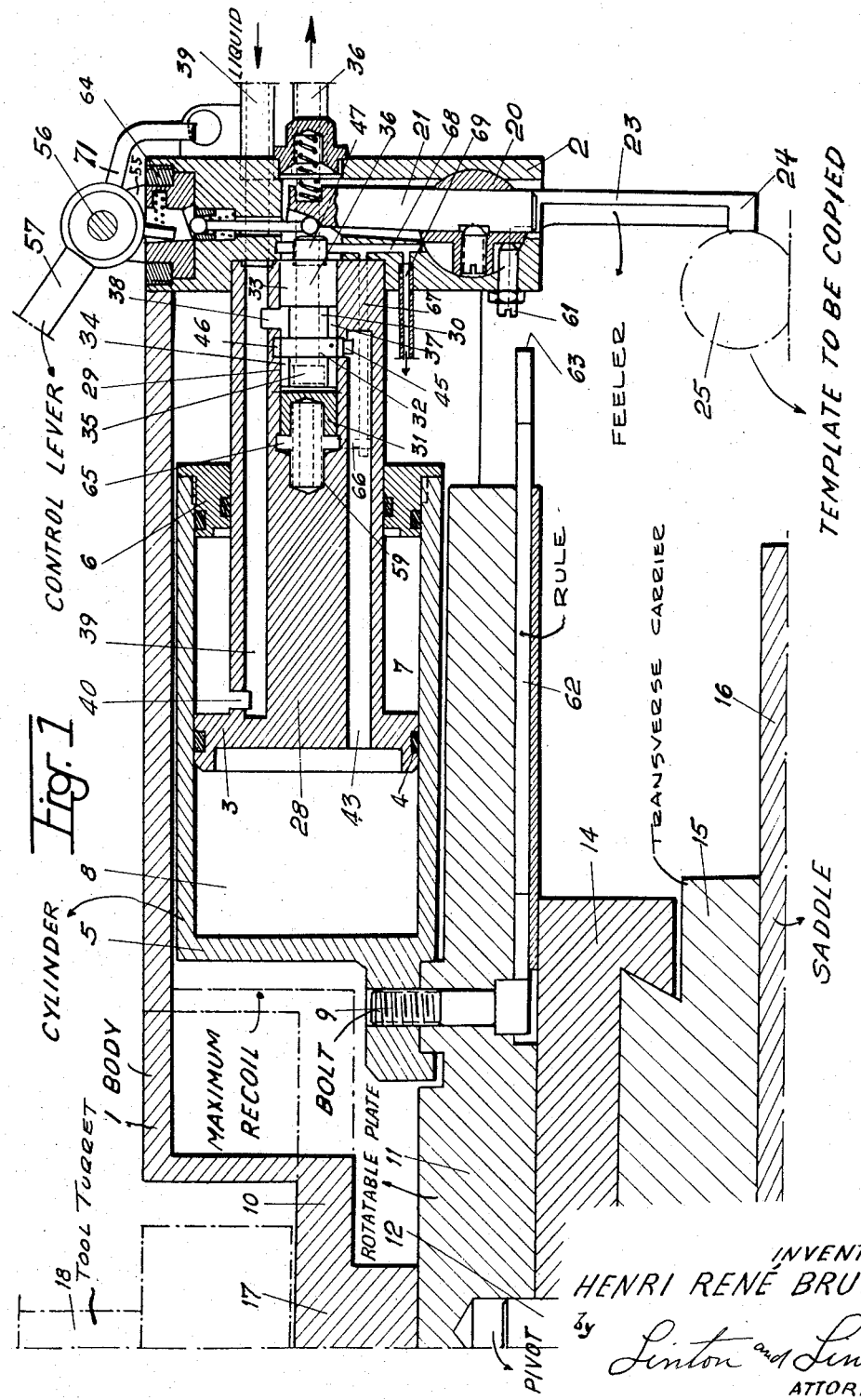

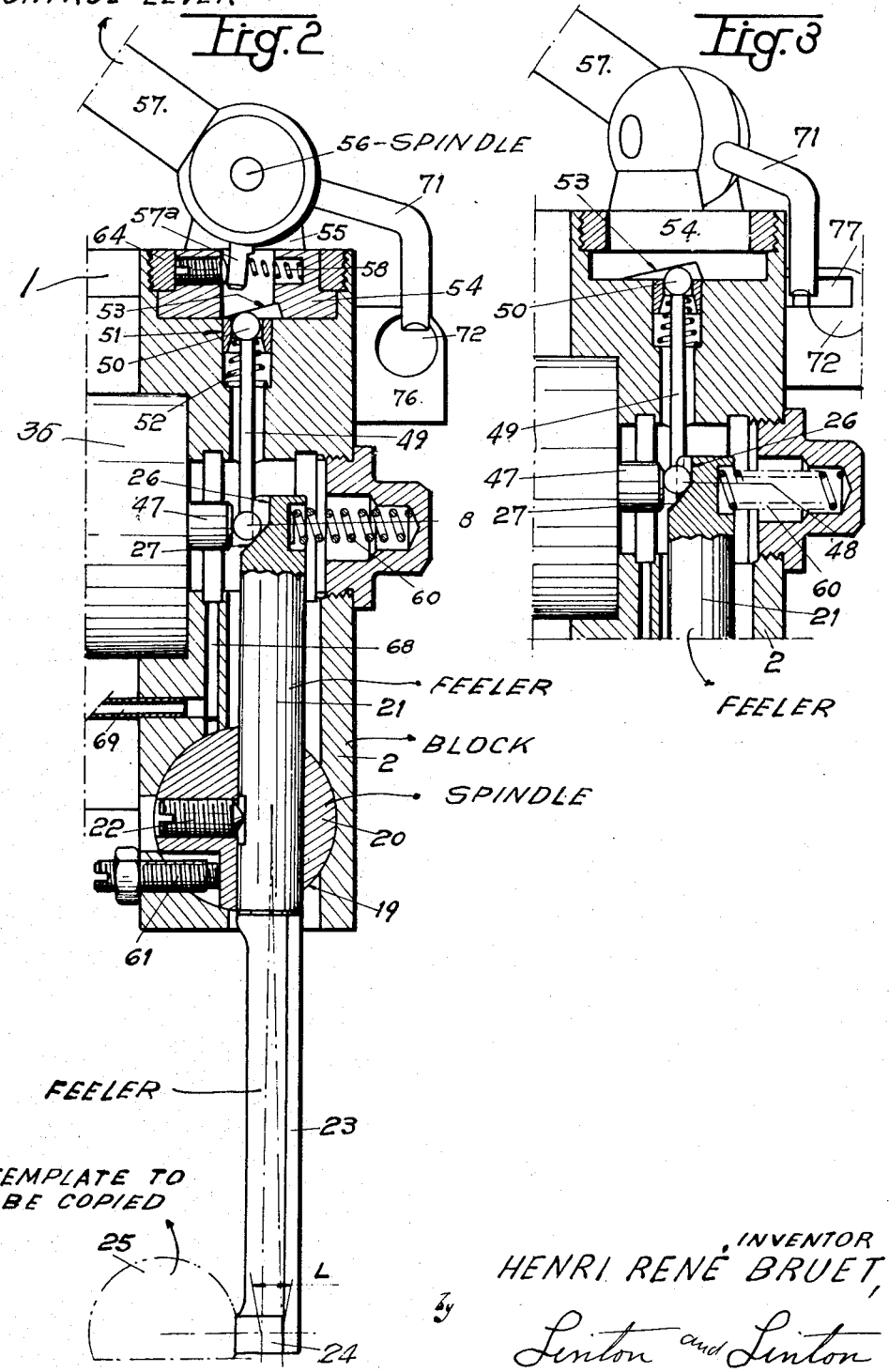

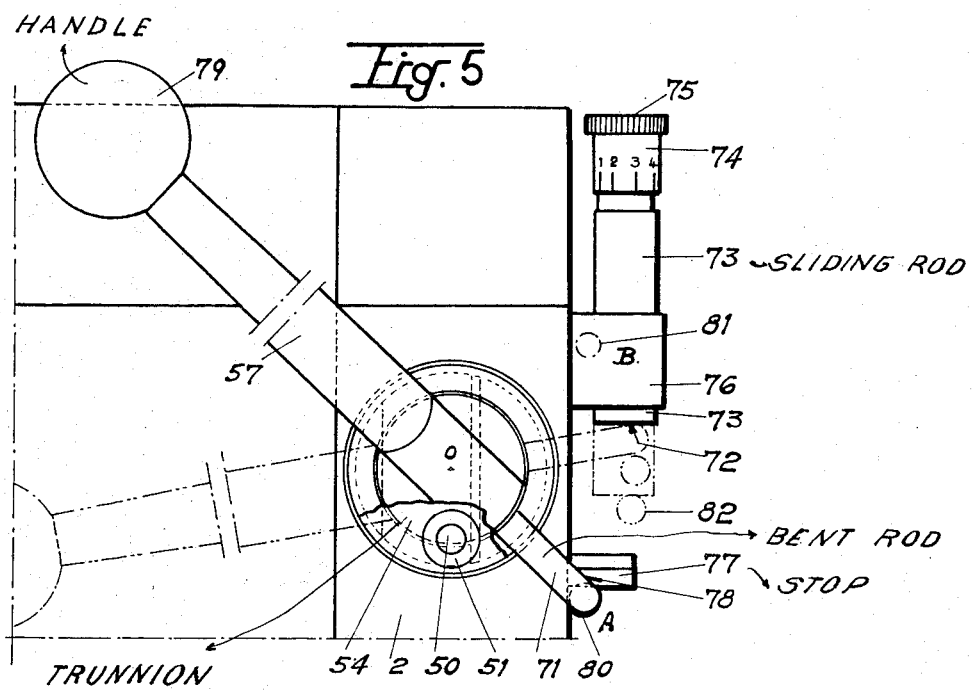
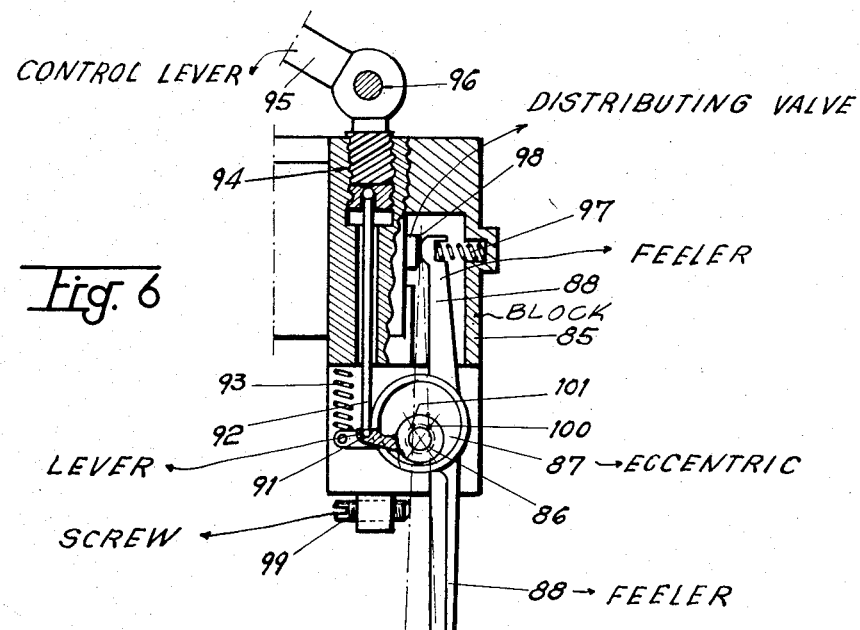

United States Patent Office 2,903,232
Patented Sept. 8, 1959

2,903,232

FEELER MECHANISM FOR HYDRAULICALLY OPERATED COPYING MACHINES

Henri René Bruet, Paris, France, assignor to Societe Anonyme dite: Etablissements Cazeneuve, La Plaine Saint-Denis, France, a French company Application March 1, 1955, Serial No. 491,412

Claims priority, application France April 16, 1954

5 Claims. (Cl. 251—3)

The present invention has for its object to provide improvements in hydraulically-operated machine tool copying machines of the type including a tracer finger or feeler arm, such machine being adapted to be mounted on any machine tool and particularly on a lathe to reproduce a template or pattern piece on a workpiece.

One of the objects of the present invention consists in the provision of a tracer finger or feeler, preferably a rocking pivoted feeler, the angular setting of which may be modified so as to act on a liquid distributor slide valve unit designed so as to operate through small successive displacements obtained under the action of thrusts of a reduced magnitude.

A further important object of the present invention consists in adjusting the distance separating the contact finger on the feeler mechanism from the edge of the template or pattern piece in an accurately measurable manner without any play.

It has also for its object to provide an arrangement controlling this feeler with a view to modifying its position and to performing machining cuts of suitable variable depths, either for obtaining a good finishing of the part to be machined or else for ensuring a succession of cuts throughout the length of such a part without any shifting of the copying machine, through a mere displacement of the transverse carriage.

The present invention consists in providing the remote head of the rocking pivoted tracer or feeler rod with a contour constituted initially for instance by a surface parallel with its axis merging into a sloping surface at a suitable angle with reference to said axis, while there is inserted between the contour surface thus defined and an extension of the liquid distributor slide valve unit, an intermediate member, preferably a ball, the longitudinal movement of which in parallelism with the feeler produces, by acting on said sloping surface, a rocking of said feeler around its spindle or pivot; said ball is controlled by a pusher rod member on which a second ball or the like part acts, this second part being in contacting relationship with a preferably rotary sloping surface to which is secured a manually displaceable control lever controlled according to requirements by the operator.

According to a further feature of the present invention, there are provided suitable stops adapted to limit the rocking of the feeler with a view to obtaining predetermined results such as for instance a moving of the feeler away from the templet or from the member to be copied in opposition to the thrust exerted by the sloping surface carrying the control lever.

In a modification, the feeler is rocked in both directions through the operation of a suitably controlled eccentric to which said feeler is pivotally secured.

The present invention consists also in further auxiliary arrangements associated with the preceding features and which will be described hereinafter in further detail.

The present invention will be readily understood through the reading of the following description, reference being made to the accompanying drawings illustrating preferred embodiments of the present invention, which embodiments are described by way of examples and by no means in a restrictive sense. In the accompanying drawings illustrating the present invention as incorporated into a lathe and carried on the transverse carriage of the latter:

Fig. 1 is a vertical longitudinal cross-scetional view of an embodiment of the arrangement according to the present invention.

Figs. 2, 3 and 4 are vertical cross-sectional views of a part of the apparatus of Fig. 1 and which show three successive characteristic positions of the tracer finger or feeler and of its controlling means.

Fig. 5 is a plan view of a control lever for the feeler mechanism.

Fig. 6 is a vertical diagrammatic view of a modified form having means providing for the rocking of the feeler through an eccentric location of its axis.

In Figs. 1, 2, 3, 4 and 5, the body or slider 1 of the copying mechanism is bolted to a supporting block 2 carrying the differential piston 3 provided with fluid tight rings 4 and sliding inside a cylinder 5 so as to define in the latter two chambers or spaces 7 and 8; the rod 28 of the piston 3 passes through a removable cylinder 6 provided with fluid tight sealing packings. The cylinder 5 is secured by bolts such as 9 to a plate 11 which is angularly movable around the pivot 12 over a support 14 held clamped over the transverse carrier 15 adapted to move over the saddle or longitudinal carriage 16. The displacement of the transverse carrier 15 with relation to saddle 16, is effected by the usual means of a screw thread and nut. The transverse movement is a displacement perpendicular to the axis of the lathe. To an extension 17 of the body or slider 1 is secured a tool-carrying turret 18 on which is clamped a tool which is not illustrated, said tool serving for cutting the work piece to be machined, which is not illustrated. This arrangement or any other similar arrangement is conventional and so is its operation.

The block 2, which comprises the essential novel components of my improved arrangement, is provided with a suitable transverse bore 19 inside of which may rock a spindle or pivot 20 provided with a bore through which passes a rod or arm 21 forming a half-feeler and held in position on the spindle 20 by a screw 22; inside a parallel bore extending through the spindle 20 is positioned the other half-feeler arm 23 held by a screw which is not illustrated, the end of which half feeler carries a contact finger member 24 adapted to engage in contacting relationship either the templet or the pattern part to be copied 25. In Fig. 2, the spindle 20 is shown in transverse section by the large circle, at the bottom of block 2, and rotates in bore 19.

In the remote end of the half-feeler 21 is formed, preferably in parallelism with its axis, a groove having a bottom 26, this bottom merging into a surface of the same breadth and sloping, say at 45°, with reference to this axis of the half-feeler 21.

The piston rod 28 of the differential piston 3 is bored at 29, the bore forming, as is well known in the art, a guide for the distributing valve 30 having three projecting bearing surfaces or beads 31, 32 and 33, so as to define two compartments, of which one 34 registers with the port 35 of the liquid discharging passage 36, while the other compartment 37 registers with the port 38 of the liquid-intake passage 39 which latter opens at 40 inside the space or chamber 7 in the cylinder 5. Liquid is supplied to feed passage 34 from a tank (not shown), and is returned to that tank from exhaust passage 36.

A channel 43 opens at one end in the chamber 8 of the cylinder 5 and at the other end into a passage 45 opening into a groove 46 in the wall of the piston rod bore 29, which groove is normally closed by the bearing surface 32 of the distributing slide valve 30 which latter includes an axial tail-piece 47. A ball 48 (Fig. 2) bears on the one hand against the outer surface of this tail piece 47, and, on the other hand, as shown in Figs. 1 and 2, against the slope 27 on the end of the half-feeler 21. This ball 48 is connected through a pusher rod member 49 with another part such as a ball 50 similar to the ball 49 and guided inside a tube 51. This second ball is urged by a spring 52 against a sloping surface 53 formed in a trunnion 54 (Fig. 2) including a strap 55 to which is pivotally secured through a vertical spindle 56 the manual control lever 57 the head of which carries a radial projection 57-a to which is applied the action of a spring 58 which urges the lever 57 into its uppermost position.

The ball 48 is clamped between the tail end 47 of the distributing slide valve unit 30 which is urged by the spring 59 towards the right side of Fig. 1, and the sloping surface 27 of the half-feeler 21 which is urged towards the left by the cooperating spring 60. The thrust of the spring 59 is limited by an adjustable abutment screw 61 against which the spindle 20 is adapted to bear through a notched part of its periphery. This is the notch into which there penetrates the end of screw 61, which is screwed onto block 2 (Fig. 2). In case of rotation of spindle 20, the course is limited by this screw 61, which is supported in this notch.

In the angularly movable plate 11 is provided a groove inside which may slide a small rule 62 adapted to move in either direction inside the groove housing it, as provided by any suitable means whether manually or mechanically controlled, and this rule 62 is adapted to be positioned in various positions whereby its end 63 engaging a notch formed in the block 2 may serve as an adjustable stop for the feeler 21—23, while it may also provide for the adjustment of the position of the tool with reference to the work piece to be machined. The trunnion 54 is held in position by a nut 64 which allows it to rotate without any substantial play.

In spite of the accuracy of the fitting of the distributing valve unit such as 30, it may occur that a few drops of liquid will escape during operation. In the arrangement according to the present invention, these drops are collected inside the grooves 65, 66, 67, and 68 so as to enter a tube 69 which feeds them back into the container from which liquid is supplied to passage 39 or towards any other suitably selected location.

In Figs. 2, 3, 4, and 5, which illustrate for the same embodiment of Fig. 1, the block 2 and the inside of the latter on a scale larger than Fig. 1, there is shown as secured to the head of the control lever 57 a bent rod 71, the outer end of which may be positioned in register with the terminal surface 72 of the horizontally displaceable rod 73 which displacements are controlled by a vernier screw 74 having a knob 75 (Fig. 5). The rod 73 is guided inside a suitably secured sleeve or carrier 76 mounted together with a stop 77 provided with a notch 78 on the block 2 at suitable locations.

The manually displaceable control lever 57 provided with a handle 79 is adapted to rock around the vertical axis O (Fig. 5), and carries along with it in its rotation the trunnion 54 (Fig. 2) provided with the sloping surface 53 and it is urged as already mentioned into its raised position by the spring 58, whereby the bent rod 71 is held in its lower position and may be positioned either in front of the surface 72 of the sliding rod 73 on the vernier screw 74, or else, after displacement, at position 80 to the rear of the stop 77 in the notch 78. By manually lowering the control lever 57, it is possible to release the end of the bent rod 71 and to bring it for instance into the position 81 (Fig. 5). During these movements, the control lever 57 constrains the trunnion 54 to swing through the angle A—O—B (Fig. 5), whereby the sloping surface 53 on the trunnion 54 shifts the ball 50 by the height required for the control of the feeler 21—23.

The vernier screw 74 which is actuated through the knurled knob 75 is adapted to shift gradually the bent rod 71 into different positions such as 82, and these movements of the bent rod which are as small as may be required, are readily measured through this vernier screw 74.

The arrangement according to the present invention acts on the operation of the copying mechanism in the following manner. The liquid under pressure fed by the pump (which is not illustrated) flows from the supply tank through the entrance channel 39 (Fig. 1) while its return into the tank (which is not illustrated) is performed through the discharge channel 36. The spaces or chambers 7 and 8 of the cylinder, the distributing slide valve unit, and the channels, are assumed to be filled with liquid. The distributing slide valve unit 30 and its medial bearing surface 32 are shifted toward the left by an action hereafter described, moving ball 48 against tail piece 47, and this allows the liquid fed under pressure through the entrance channel 39 to pass through passage 45 and through the channel 43 into the chamber 8 of the cylinder, and this has for its result an equalization of the pressures in the two chambers 7 and 8 while it produces, by reason of the difference between the areas of the two surfaces of the piston on which the liquid acts, a shifting towards the right side of the system including the body or slider 1, the block 2, the piston 3 and the tool carrier 18 with its tool, whereby the latter is moved away from the work piece to be machined (not shown), and the contact finger 24 is moved away from the templet or the like part 25.

The shifting toward the right side of the distributing slide valve unit 30 and toward the left side of its medial bearing surface 32 also allows the liquid to flow back from the chamber 8 through the channel 43 and the discharge passage 36 toward the tank container, while the liquid under pressure in the entrance channel 39 acts inside the chamber 7 on the corresponding surface of the piston 3, and this leads to the shifting toward the left of the assembly including the body or slider 1, the block 2, the piston 3, and the tool carrier 18 with its tool, whereby the latter moves nearer the work piece to be machined (not shown), and the contact finger 24 moves nearer the templet or the pattern part 25.

The operative bearing surface 32 of the distributing slide valve unit closes in its neutral position the groove 46 in the groove of piston 3 so as to separate thus the inlet and discharge channels 36 and 39. The movements of this slide valve unit toward the right side and toward the left side of this neutral position, are provided for by the half-feeler 21 which rocks or pivots around the axis of the spindle 20 as provided by the engagement of the surface of the templet 25 with the contact finger, and also by the engagement of the ball 50 with the sloping surface 53 of trunnion 54, which, as described hereinafter, is caused to rotate around the axis O of the trunnion 54 by the manual control lever 57 moving through the angle A—O—B.

It is possible, through adjustment of the stop 61 engaging the spindle 20 carrying the feeler 21—23 and acting against the spring 59, to adjust the location of the operative bearing surface 32 of slide valve unit 30 to adjust the point at which the liquid may pass out of the space or chamber 8 into the discharge channel 36, which has for its result to urge the feeler 21—23 toward the templet 25 and the tool toward the work piece to be machined (not shown). If, under such conditions, the control lever 57 is manually actuated so as to bring the sloping surface 53 of trunnion 54 into the position illustrated in Fig. 4 and corresponding to the angular setting O—B in Fig. 5, this will depress the ball 50 which in its turn acts through the pusher member 49 on the ball 48 so as to make the latter slide over the sloping surface 27 of the half-feeler 21 and urge toward the left the tail piece 47 of the distributing slide valve unit 30 which passes from the position illustrated in dot-and-dash lines up to the position illustrated in solid lines in Fig. 4, whereby the bearing surface 32 allows the liquid under pressure from the inlet channel 39 to enter the space or chamber 8 which leads to a receding movement to the left of the assembly including the body 1, the block 2 and the piston 3, and thereby movement of the contact finger 24 away from the templet 25 and movement of the tool away from the work piece to be machined (not shown). The angular displacement of the sloping surface 53 of trunnion 54 by the manual control lever 57 thus ensures as desired the forward and the receding movement, with reference to the work piece to be machined, and with reference to the templet, of the sliding assembly of parts of the machine.

As is apparent from the preceding description, such rotation of the trunnion 54 and of its sloping surface 53 produces a shifting of the unit including the ball 48, the pusher rod member 49, and the ball 50, which are preferably formed as one integral unit and are urged by the spring 52 toward the sloping surface 53. This shifting movement of this unit is adapted to bring the ball 48 into contacting relationship with the groove surface 26 formed on the end of the half-feeler 21, so that the angular movement of the sloping surface 53 of trunnion 54 between the position illustrated in Fig. 3 and that illustrated in Fig. 2, produces a rocking of the feeler 21—23 around the pivot spindle 20, whereby the contact finger 24 moves over an arc the length of which is L (Fig. 2).

This angular movement of the sloping surface 53 of trunnion 54 may be produced and measured by the vernier screw 74, the sliding member 73 of which is adapted by its surface 72 to urge back into its original position the bent rod 71 fixedly secured to the manual control lever 57. It is thus possible to move bent rod 71 between the position illustrated in Fig. 2 and that illustrated in Fig. 3 by acting on the vernier screw 74 so as to make the bent rod 71 move. This defines a multiplicity of intermediate positions for the feeler 21—23 and of its contact finger 24, without having to resort to the movement of the copying mechanism assembly transversely, and this also permits producing cuts of different depths and in particular a finishing cut of a reduced depth which ensures an optimum accuracy in the operation on the work piece to be machined.

The small rule 62 may advantageously be operated by means of a manual control or by means of a mechanical control which is not illustrated, so as to provide for the locking in various positions of the feeler 21—23 and thus also to adjust the movement of the tool in tool holder 18 toward the work piece to be machined (not shown).

Fig. 6 is a diagrammatic cross-section of another modified embodiment of my improved machine. In Fig. 6, the block 85, similar to the block 2 of the preceding embodiment of Figs. 1-5, rotatably supports a spindle 86 provided with an eccentric 87 on which is rotatably mounted a tracer or feeler 88 carrying at its outer end the contact finger 89 adapted to engage the templet or the pattern piece 90 to be copied. To the spindle 86 is keyed a lever 91 while a pusher member 92 urged by the action of a tension spring 93 is positioned between this lever 91 and a stop screw 94 adapted to be screwed or unscrewed with reference to the block 85 under the action of a lever 95 pivotally secured at 96 to the terminal strap extension of this screw 94. A spring 97 urges the feeler 88 against the tail end 98 of the distributing slide valve which is not illustrated in Fig. 6. An adjustable stop screw 99 is adapted to limit the movement of the feeler 88, the arc along which it rocks being of the magnitude shown at $L^1$ when the major radius of the eccentric 87 is shifted between the line 100 and the line 101.

The operation of the embodiment of Fig. 6 is similar to that of the preceding described arrangement of Figs. 1–5. The adjustable stop screw 99 adjusts the position of the feeler 88 so that the distributing slide valve may provide for the movement of the tool toward the work piece to be machined (not shown), and it is sufficient to produce a modification in the location of the major radius of the eccentric, for instance beyond the line 100 toward the left, by means of a screwing down of the screw 94 so as to urge back through operation of the end of the feeler 88 the tail end 98 of the distributing slide valve toward the left side, while the tool is moved away from the work piece to be machined and the feeler 88 is moved away from the templet 90. Movement of the eccentric 87 fixedly connected to the spindle 86 will provide within the limits of the arc $L^1$ a multiplicity of positions for the contact finger 89 of the feeler 88, which positions are defined by the screwing or unscrewing through any suitable amount of the screw 94 inside the block 85.

The present invention may include various other additional or complementary features similar to those which have been described, or otherwise. It should furthermore be understood that the present invention is not limited to the particular applications which have been chosen for presentation by way of example, or to the particular embodiments of its different parts which have been described in detail, and the present invention covers all modifications thereof which come within the scope of the accompanying claims.

What I claim is:

1. A feeler mechanism for machine tool hydraulically operated copying machines including a displaceable fluid slide distributor having a terminal engaging face and comprising a support member, an arm rockably mounted on said member and having one end in slideable contact with the pattern piece to be reproduced, a spring carried by said supporting member urging the opposite end of said arm towards said engaging face of said slide distributor for moving the same, a longitudinally movable member in contact with a portion of said arm for imparting a transverse displacement thereto away from said slide distributor, a rotatable member capable of imparting movement to said longitudinally movable member, a spring tending to move said longitudinally movable member away from said arm towards said rotatable member, and a lever for controlling said rotatable member.

2. A feeler mechanism for machine tool hydraulically operated copying machines including a displaceable fluid slide distributor having a terminal engaging face and comprising a supporting member, an arm rockably mounted on said member and having one end in slideable contact with the pattern piece to be reproduced, a spring carried by said supporting member urging the opposite end of said arm towards said engaging face of said slide distributor for moving the same, a longitudinally movable member in contact with a portion of said arm for imparting a transverse displacement thereto away from said slide distributor, a rotatable member capable of imparting movement to said longitudinally movable member, a spring tending to move said longitudinally movable member away from said arm towards said rotatable member, a lever for controlling said rotatable member, an angular rod connected to and extending from said lever, and a manually operable vernier control means carried by said supporting member and capable of engaging and moving said rod and said rotatable member therewith.

3. A feeler mechanism for machine tool hydraulically operated copying machines including a displaceable fluid slide distributor, having a terminal engaging face and comprising a support, an arm rockably mounted on said support and having one end in slideable contact with the pattern piece to be reproduced, a spring carried by said support urging the opposite end of said arm towards said engaging face of said slide distributor for moving the same, a member rotatably mounted on said support and having an inclined portion, a longitudinally movable member in contact with a portion of said arm for imparting a transverse displacement thereto away from said slide distributor, a sphere carried by one end of said longitudinally movable member, a spring tending to move said longitudinally movable member from said arm and said sphere against said inclined portion of said rotatably mounted member, and a lever for turning said rotatable member for moving said inclined portion of said rotatably mounted member over said sphere whereby said longitudinally movable member can be raised or lowered as required.

4. A feeler mechanism for machine tool hydraulically operated copying machines including a displaceable fluid slide distributor having a terminal engaging face and comprising a support, an arm rockably mounted on said support and having one end in slideable contact with the pattern piece to be reproduced, a spring carried by said support urging the opposite end of said arm towards said engaging face of said slide distributor for moving the same, a member being rotatably mounted on said support and having an inclined surface, an elongated member slideably mounted in and guided by said support for longitudinal movement, a pair of spheres respectively carried at opposite ends of said elongated member with one sphere in sliding contact with said inclined surface of said rotatably mounted member and the other sphere in sliding contact with and between a side of said elongated member and said engaging surface of said slide distributor, a second spring tending to move said elongated member towards said rotatable member, and a lever for rotating said rotatable member whereby said inclined surface in conjunction with said second spring will move its contacting sphere upwardy and downwardly moving said arm and slide distributor to and from one another.

5. A feeler mechanism for machine tool hydraulically operated copying machines including a displaceable fluid slide distributor having a terminal engaging face and comprising a support, an elongated arm rockably mounted on said support and positioned for having one end in slideable contact with the pattern piece to be reproduced, a spring mounted on said support urging the opposite end of said arm towards said engaging face of said slide distributor, the opposite end of said arm having an inclined surface facing said engaging face of said slide distributor, a member rotatably mounted on said support having an inclined surface, a rod having spherical ends with one end slideably contacting said inclined surface of said rotatably mounted member and the opposite end slideably engaging and positioned between said inclined surface of said arm and said engaging face of said slide distributor, a lever pivotally mounted on said rotatable member and capable of rotating the same whereby said inclined surface of said rotatably mounted member moves said rod longitudinally with said spherical end of said rod between said inclined surface of said arm and said engaging face of said slide distributor and moves said slide distributor laterally, an angular rod fixedly connected to and extending from said lever, means for finely adjusting the position of said angular rod and accordingly said rotatable member, and resilient means tending to pivot said angular rod into position for being contacted by said adjusting means.

References Cited in the file of this patent

UNITED STATES PATENTS

| | | |
|---|---|---|
| 2,331,443 | Von Zelewsky | Oct. 12, 1943 |
| 2,332,532 | Roehm | Oct. 26, 1943 |
| 2,332,533 | Roehm | Oct. 26, 1943 |
| 2,437,570 | Von Zelewsky | Mar. 9, 1948 |
| 2,500,450 | Carleton | Mar. 14, 1950 |